United States Patent
Yang

(10) Patent No.: US 11,391,821 B2
(45) Date of Patent: Jul. 19, 2022

(54) NEAR-FIELD PULSE DETECTION

(71) Applicant: LEICA GEOSYSTEMS AG, Heerbrugg (CH)

(72) Inventor: Quan Yang, Thornhill (CA)

(73) Assignee: LEICA GEOSYSTEMS AG, Heerbrugg (CH)

( * ) Notice: Subject to any disclaimer, the term of this patent is extended or adjusted under 35 U.S.C. 154(b) by 898 days.

(21) Appl. No.: 16/208,387

(22) Filed: Dec. 3, 2018

(65) Prior Publication Data

US 2019/0187285 A1 Jun. 20, 2019

(30) Foreign Application Priority Data

Dec. 20, 2017 (EP) ..................................... 17209172

(51) Int. Cl.
*G01S 7/481* (2006.01)
*G01S 17/933* (2020.01)
(Continued)

(52) U.S. Cl.
CPC .......... *G01S 7/4816* (2013.01); *G01S 7/4876* (2013.01); *G01S 17/10* (2013.01); *G01S 17/26* (2020.01);
(Continued)

(58) Field of Classification Search
CPC .......... G01S 7/16; G01S 7/4818; G01S 7/486; G01S 7/487; G01S 17/26; G01S 17/86;
(Continued)

(56) References Cited

U.S. PATENT DOCUMENTS 4,441,810 A * 4/1984 Momose ................. G01S 17/46
356/3.15
4,694,149 A * 9/1987 Toyama .................... G01C 3/10
250/201.4
(Continued)

FOREIGN PATENT DOCUMENTS

CA 2 950 937 A1 6/2017
CN 107037444 A * 8/2017
(Continued)

OTHER PUBLICATIONS

"Tom Corbett, Photoelectric Sensors Use Time-of-Flight Measurement, Apr. 16, 2015" (Year: 2015).*
(Continued)

*Primary Examiner* — Yuqing Xiao
*Assistant Examiner* — Woohyeong Cho
(74) *Attorney, Agent, or Firm* — Maschoff Brennan

(57) ABSTRACT

A airborne range finder arranged on an aircraft for surveying a target, the finder comprising an emitter configured for emitting electromagnetic pulses towards the target, a receiver for receiving backscattered pulses, wherein the receiver comprises a projection surface comprising an inner area and an outer area, focusing optics configured for imaging pulses backscattered from a distance equal to or longer than a threshold distance onto the inner area, and pulses backscattered from a distance shorter than said threshold distance onto the inner area and a part of the outer area, a detector configured for detecting and outputting pulses imaged onto the projection surface, and a recorder configured for reading the detector and storing pulses detected only within the inner area as target pulses, storing pulses detected within the outer area as near-field pulses, and tagging each stored pulse with a corresponding pulse reception time, and a control unit.

15 Claims, 3 Drawing Sheets

Figure 1:
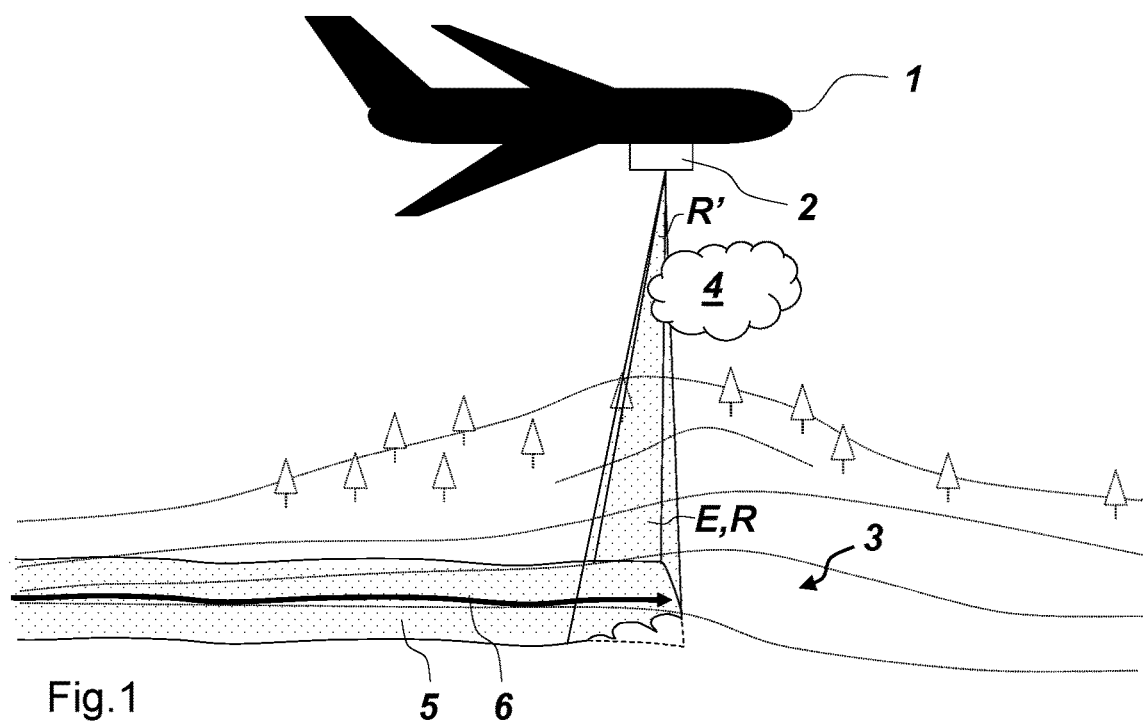

(51) Int. Cl.
 *G01S 17/42* (2006.01)
 *G01S 7/487* (2006.01)
 *G01S 17/89* (2020.01)
 *G01S 17/10* (2020.01)
 *G01S 17/26* (2020.01)
 *G01S 17/86* (2020.01)

(52) U.S. Cl.
 CPC .............. *G01S 17/42* (2013.01); *G01S 17/86* (2020.01); *G01S 17/89* (2013.01); *G01S 17/933* (2013.01)

(58) Field of Classification Search
 CPC .......... G01S 17/10; G01S 17/42; G01S 17/89; G01S 17/933; G01S 7/4816
 See application file for complete search history.

(56) References Cited

U.S. PATENT DOCUMENTS

| | | | | |
|---|---|---|---|---|
| 5,541,403 A * | 7/1996 | Heinonen | ............... | G01S 17/04 250/221 |
| 5,754,281 A | 5/1998 | Maeda | | |
| 5,790,242 A * | 8/1998 | Stern | ...................... | G01S 17/89 356/4.04 |
| 8,384,884 B2 * | 2/2013 | Kaneko | ................. | G01S 7/4811 356/5.01 |
| 8,605,261 B2 * | 12/2013 | Rindle | .................... | G01S 17/18 356/5.03 |
| 9,165,383 B1 * | 10/2015 | Mendez-Rodriguez | ..................... | G01S 7/51 |
| 10,324,170 B1 * | 6/2019 | Engberg, Jr | ....... | G02B 26/0816 |
| 2014/0226145 A1 * | 8/2014 | Steffey | .................. | G01S 7/4813 356/4.01 |
| 2019/0353767 A1 * | 11/2019 | Eberspach | .............. | G01S 17/32 |

FOREIGN PATENT DOCUMENTS

| | | | | |
|---|---|---|---|---|
| DE | 36 27 972 A1 | 2/1988 | | |
| DE | 19707418 A1 * | 8/1998 | .......... | G01S 7/4812 |
| EP | 1624322 A1 * | 2/2006 | .............. | G01V 8/10 |
| EP | 3 182 159 A1 | 6/2017 | | |

OTHER PUBLICATIONS

European Search Report dated Jun. 6, 2018 as received in Application No. 17 20 9172.

* cited by examiner

NEAR-FIELD PULSE DETECTION

CROSS-REFERENCE TO RELATED APPLICATIONS

This application claims priority to European Patent Application No. 17209172, filed on Dec. 20, 2017. The foregoing patent application are incorporated herein by reference.

FIELD OF INVENTION

The present invention relates to an airborne range finder configured to be arranged on an aircraft for surveying a target.

BACKGROUND

Surveying a 2D or 3D topography of a target with an airborne surveying device is commonly achieved by laser range finders which send out pulses of light to sample the target, such as the ground surface, and receive the pulses after they reflected from the target. The time of flight between the emission and the return of each pulse can be used to determine according distances to target.

Occasionally, before arriving at the target outgoing pulses may hit obstacles, such as particles or clouds, potentially causing false measurements because the times of flight calculated with these reflected pulses do not represent a distance to the intended target.

By definition, the intensity of the reflected light is decreased by a factor proportional to the square of the distance. Therefore, returning from large distances where the intended target is located, the detected light usually has a small magnitude.

While false measurement values could be sorted out based on the intensity of the received pulses, this method is ineffective when the intensity of the light backscattered from the near-field obstacle—e.g. due to fractional backscattering—is similar to the intensity of a signal regularly reflected from the target. In this case, the returning light pulse may still falsely trigger the detection of a pulse.

As long as the time between the emitted pulses would be larger than the round-trip-time of the reflected pulse (from the emitter, to the target, and back to the receiver) it could still be possible to discriminate close range returns from intended target returns by considering the estimated distance.

However, this solution becomes impractical, too, when the laser range finder operates in Multiple Pulses in the Air (MPiA) mode. In this case, additional start pulses are emitted before the light reflected by the target from the first pulse is detected. The return pulse is usually associated with the correct emitted pulse by knowing how many pulses have to be emitted before the reflection arrives, and calculate the true distance accurately. This is where close range returns confuse the sequences: they happen to be falsely considered as target returns because they cannot easily be discriminated from the true target returns. The likelihood of these near-field reflections being similar in size and shape compared to true target reflections is quite high, making it very hard to filter them out.

The purpose of this invention is therefore to improve a typical laser range finder, even when operated in MPiA mode, in that it allows for detecting whether a reflected pulse comes from a close range or from a distant range. In particular, this distinguishing information may be used to suppress unwanted close range pulses from being recorded, therewith keeping measurement data clean and free from false measurement values.

At least one of these improvements is achieved by the airborne laser range finder according to the invention.

BRIEF DESCRIPTION

Some aspects of the invention relate to airborne range finder configured to be arranged on an aircraft for surveying a target, wherein the airborne range finder comprises an emitter configured for emitting electromagnetic pulses towards the target, a receiver configured for receiving backscattered pulses, wherein the receiver comprises a projection surface comprising an inner area and an outer area, focusing optics configured and arranged for imaging pulses backscattered from a distance equal to or longer than a threshold distance onto at least a part of the inner area, and pulses backscattered from a distance shorter than said threshold distance onto the inner area and at least a part of the outer area, a detector configured for detecting and outputting pulses imaged onto the projection surface separately with respect to the inner area and the outer area, and a recorder configured for reading the detector and storing pulses detected only within the inner area as target pulses, storing pulses detected at least in part within the outer area as near-field pulses, and tagging each stored pulse with a corresponding pulse reception time, and a control unit configured for controlling the emitter and the receiver.

The receiver may further comprise an optical dissection element comprising an inlet forming the projection surface with the inner area and an outer area, a first outlet configured for outputting light entering the inner area of the inlet, and a second outlet configured for outputting light entering the outer area of the inlet.

The inner area may correspond to the circle of confusion of a pulse backscattered from the threshold distance.

The focusing optics may comprise a motor configured for adjusting the focal point.

The control unit may be configured for controlling the motor based on a current distance between the target and the airborne range finder, i.e. the flight altitude. For example, the flight altitude may be determined by the range finder itself or by receiving according data from an external unit.

The focusing optics and the projection surface may be arranged and configured with regard to focusing distance and focal length such that the imaging on the projection surface of pulses backscattered from a distance equal to or longer than the threshold distance remains inside the inner area. The optical axis of the focusing optics may pass through the inner area of the inlet, in particular through the centre of the inner area. The focusing optics and the projection surface may be arranged and configured such that pulses backscattered from objects closer than the threshold distance are not only imaged onto the inner area but additionally also onto the outer area of the inlet.

The depth of field of the focusing optics may be adapted such that the circle of confusion of a pulse backscattered from a distance equal to or longer than the threshold distance is equal to or smaller than the inner area.

In a particular embodiment, the optical dissection element is embodied as a fibre optics apparatus. The inlet may in this case be configured such that at least one of the inner area and the outer area is formed by at least one ending of a fibre comprised by the fibre optics apparatus.

The detector may be configured for suppressing the outputting of pulses detected on at least the outer area of the projection surface.

The emitter may be configured for modulating the pulses, and the receiver is configured for detecting, in particular identifying, the pulses as reflections of the emitted pulses by said modulation.

The airborne range finder may further comprise an optical element configured for deflecting the pulses along pulse paths towards the target, and deflecting the backscattered pulses towards the receiver, and a motor configured for altering the pulse paths by moving the optical element, the wherein the control unit may be configured for determining directions of the pulse paths. The optical element can for example be a prism or a mirror.

The motor may be configured for rotating the optical element around a rotation axis, and the optical element may be arranged relative to the emitter in such a way that the optical element deflects the pulses in a defined constant angle relative to the rotation axis or relative to the oscillation axis.

The recorder may be configured for receiving and storing flight data from the aircraft, said flight data for example comprising flight altitude data.

The airborne range finder may further comprise a positioning sensor for determining flight altitude data and position data, wherein the recorder can be configured for receiving said flight altitude data and position data from the positioning sensor.

DETAILED DESCRIPTION OF THE DRAWINGS

Figure 2:
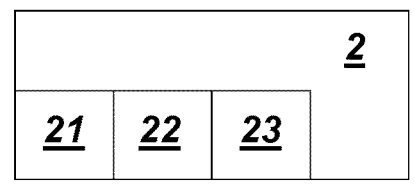
Figure 3:
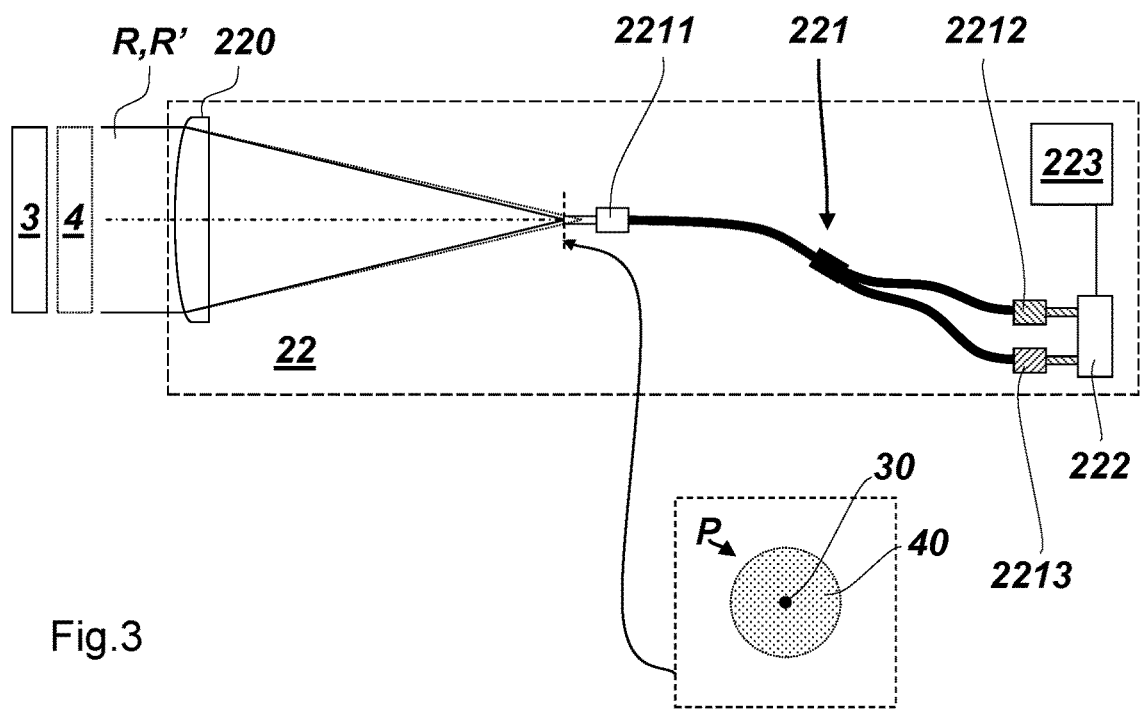
Figure 4:
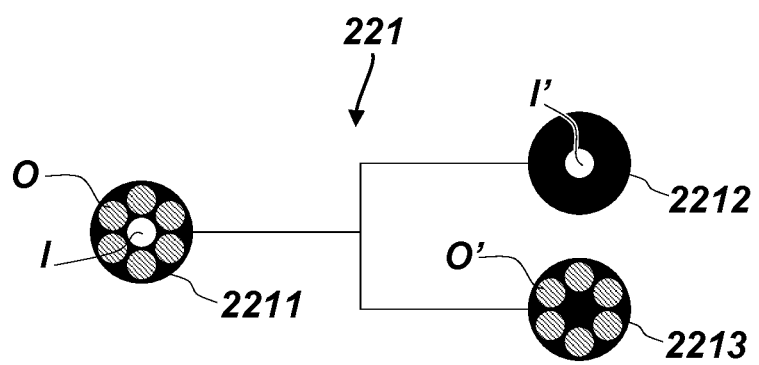
Figure 5:
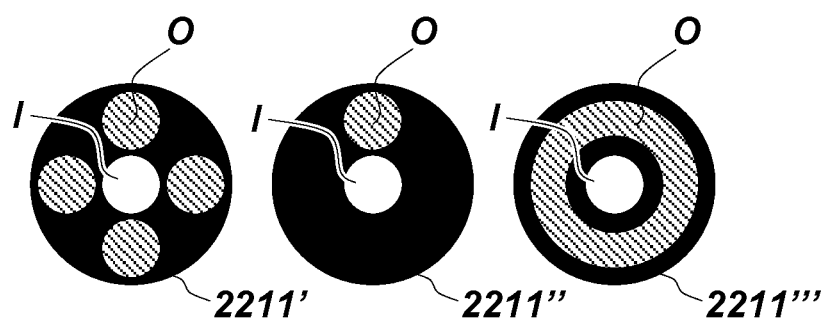
Figure 6:
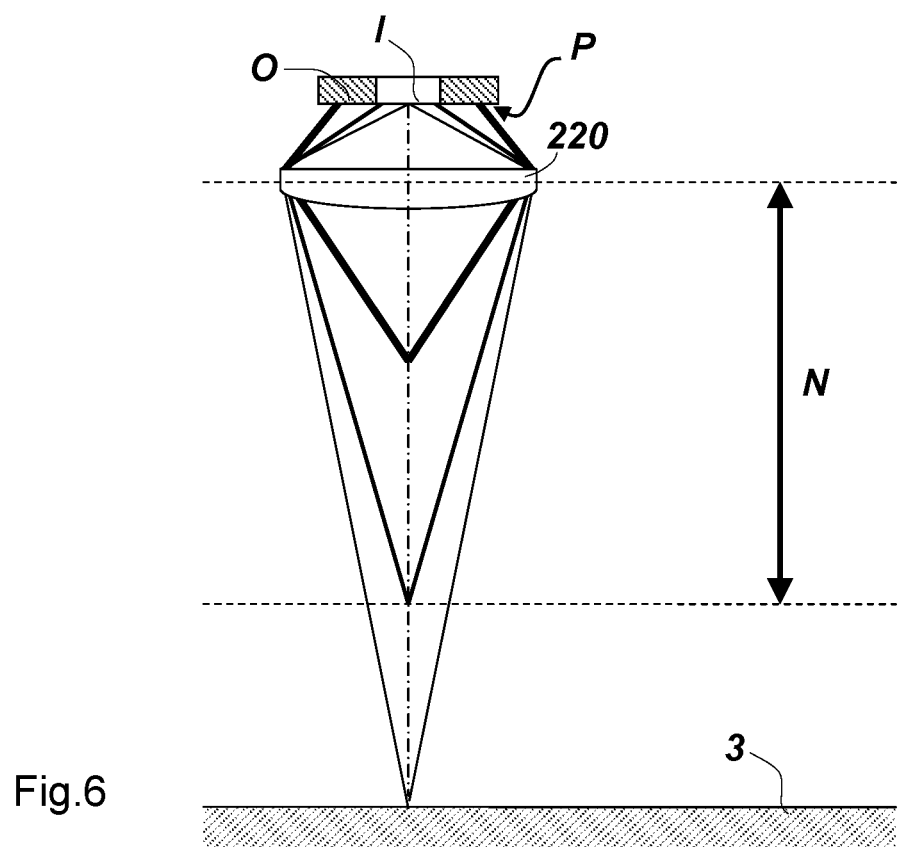

In the following, the invention will be described in detail by referring to exemplary embodiments that are accompanied by figures, in which:

FIG. 1: shows an aircraft flying over a ground surface, a flight path (trajectory) of the aircraft, an airborne range finder according to the invention arranged on the aircraft, laser pulses emitted by the airborne range finder, and a cloud as an obstacle;

FIG. 2: shows a schematic configuration of the airborne range finder;

FIG. 3: shows a schematic configuration of a particular embodiment of the receiver of the range finder;

FIG. 4: shows a schematic configuration of a particular embodiment of the projection plane, wherewith projections of pulses can be split;

FIG. 5: shows embodiments of the projection plane;

FIG. 6: shows an exemplary configuration of the focusing optics and the projection plane based on a near-field range reaching from the focusing optics to a threshold distance;

DETAILED DESCRIPTION

FIG. 1 shows an aircraft 1 flying over a ground surface 3, which is the intended target, following a flight path 6 (trajectory). The aircraft carries an airborne range finder 2 according to an embodiment of the invention. By emitting multiple light pulses E and receiving them as backscattered pulses R, the range finder can at least continuously measure the flight altitude, but in particular record a two-dimensional (2D) profile of the flight path 6. In a further particular case, the range finder can rotate or oscillate the pulse path, and therewith sample a plurality of points 5 of the swath of the aircraft. In real-time or afterwards in a post processing, a point cloud can be generated based on the laser pulses E,R emitted and received by the range finder, which are registered with according time stamps of their emission/reception.

The cloud 4 represents an exemplary near-field obstacle potentially causing the range finder 2 to generate false measurement values which do not represent the actual target. R' are pulses returning from said obstacle 4.

According to the abstract overview shown in FIG. 2, the airborne range finder 2 comprises an emitter 21, a receiver 22, and a control unit 23 which is coordinating the data collection with the emitter and the receiver.

FIG. 3 shows the basic construction of the receiver 22, a target 3 (full lines) at an expected distance to the range finder, and a near-field object 4 (pointed lines). Backscattered pulse light R, R' enters the receiver through the focusing optics 220, which is here—to simplify matters—represented by only one lens (it may in particular embodiments comprise more than one lens). The receiver 22 comprises said focusing optics 220 and, in a preferred embodiment, may comprise a fibre optics apparatus 221 as optical dissection element which helps to dissect and transfer the pulse light to a detector 222. In the shown embodiment, the detector 222 is connected to outlets 2212 and 2213 of the fibre optics apparatus, and is configured for detecting pulses R, and separately therefrom, pulses R'. The detector is configured for outputting these discriminated pulses and pass it on to a recorder 223. In particular, the detector can suppress outputting pulses backscattered from objects that are not intended to be surveyed based on the returning pulse light. The shown fibre optics apparatus is one example for an optical dissection element. Further examples of an optical dissection element may be a lens array, a prism (arrangement), an aperture matrix or diaphragm, and so on.

The recorder 223 is configured for recording the data outputted by the detector 222. For every received pulse, an according time value of reception is stored. Further, the pulses are tagged with information on whether they returned from a near-field range or from a distance where the target is expected.

Light R' backscattering from the close object 4 appears as blurry return spot 40 on the projection surface P with a relatively large circle of confusion. In the particular case of the receiver comprising the shown fibre optics 221, the projection surface P is formed by the inlet 2211. In any case, for the projections surface P an inner area and an outer area are defined for discriminating pulses from a near-field range from regular pulses. The blurry spot 40 covers both the inner area and the outer area at least in part. Depending on the proximity of the object 4, the circle of confusion of a returning pulse imaged onto the projection surface may be so large such that part of the light R' even falls beyond the outer area (i.e. in particular beyond the inlet 2211).

Light R backscattered from the intended (remote) target 3 is imaged as focused spot 30 within the inner area. The spot 30 may also be slightly unfocused. However, the focusing optics 220 is designed and arranged in such a way that the spot 30 remains within the inner area as long as the distance between the range finder and the reflecting object is farther away than a defined threshold distance or as far as the threshold distance. The depth of field is predetermined such that a pulse returning from a specific near-field range is always at least in part imaged onto the outer area of the projection surface.

A definition of the inner area and the outer area of the projection surface is based on said threshold distance, wherein the intended target is expectedly located farther than the threshold distance. The threshold distance may be chosen under the premise that it can be ruled out that objects which are closer than the threshold distance could be the intended target.

A fibre optics apparatus 221 is configured for splitting the light projected onto the surface of the inlet 2211 (projection surface P) to a first outlet 2212 and a second outlet 2213. The first outlet 2212 is configured for outputting light projected onto the inner area of the inlet surface, and the second outlet 2213 is configured for outputting light projected onto the outer area of the inlet surface. With this configuration, a discrimination of near and far reflections can be achieved by the detector 222 by detecting from which of the outlets 2212 and 2213 the pulse is coming.

If only the first outlet 2212 is outputting light, the recorder may as a consequence store a pulse reception along with an indication that the present pulse corresponds to a remote target. If, in addition, also the second outlet 2213 is outputting light, the recorder may accordingly store a pulse reception along with an indication that the received pulse corresponds to a near-field target, or, alternatively, the detector 222 may even right away suppress an output at all. An a priori suppression may be desired in case return pulses from close distances are not relevant for the data collection.

FIG. 4 shows a schematic configuration of the fibre optics apparatus 221 shown in FIG. 3. Its interfaces are the inlet 2211, the first outlet 2212, and the second outlet 2213. FIG. 5 shows alternative embodiments 2211', 2211", and 2211''' of the said inlet.

For example, the fibre optics apparatus 221 comprises a matrix material (black element) carrying at least one fibre (shaded circle) which has an ending in the outer area O of the projection surface (inlet 2211) and an ending in the outer area O' of the second outlet 2213. The fibre optics apparatus further comprises at least one, in particular arranged concentrically relative to the matrix material, fibre (white circle) which has an ending in the inner area I of the projection surface (inlet 2211) and an ending in the inner area I' of the first outlet 2212. Each fibre is configured for guiding the pulse light from the inlet to the according outlet.

To emphasize the principle of the inner/outer area discrimination, outlets 2212 and 2213 are shown exactly with the corresponding elements/circle from the inlet 2211. It is however apparent to a skilled person that the outlets do not have to be configured exactly like the corresponding endings at the inlet. For example, by adequate optical couplings, it is possible to merge or split the fibres. In particular, each outlet may only have one ending fibre.

According to FIG. 5, the outer area may comprise less (2211') or even only one eccentric fibre (2211") ending which leads to the corresponding second outlet. Furthermore, other fibre shapes may be used as is indicated by the annulus shaped ending (see in outlet 2211''').

FIG. 6 shows how the focusing optics 220 is configured and arranged relative to the projection surface P based on a near-field range beyond which the target 3 is expectedly located. The near-field range is defined by a threshold distance N away from the range finder. Particularly, the focusing distance is set such that the target 3 is sharply imaged onto the centre of the inner area I of the inlet 2211, and in particular such that the border of the near-field range images a pulse fully onto the inner area I and only just not onto the outer area O. Those are by definition the pulses of interest, and hence they are not covering the outer area O. On the other hand, a pulse backscattering from a distance less than the threshold distance N will be imaged onto the inner area I but also onto at least part of the outer area O.

In a particular embodiment, a current flight altitude can affect the arrangement of focusing optics 220 and projection surface P. For example, a motor for the focusing optics is configured for adjusting the focal point depending on the current flight altitude. The flight altitude could be measured by a single time of flight measurement, or could be read from an electronic flight instrument system already at present in the aircraft. For example, in case of a significant flight altitude reduction, the relative arrangement between the projection surface P and the focusing optics can be adapted to avoid that the desired target is "diving" into the range N.

As explained above, the projection onto the outer area O is causing the recorder to store that particular pulse as a near-field pulse. In a particular embodiment, the detector can also cause a suppression of that near-field pulse. In this case the detector is just skipping the near-field pulse.

In particular, the radial spacing between the inner area and the outer area may be adjusted depending on the desired near-field range N. For example, when flying over mountains, the height differences can be enormous such that false returns may be desired to be sorted out only within a range of about 100 meters under the aircraft. In this case, spacing between fibre endings in the outer area of the inlet and fibre endings in the inner area is relatively large, or in other words, the inner area is relatively large. In case there are only small height differences on the target 3 along the flight path 6, the inner area of the inlet can be chosen relatively small.

Other variables to consider when setting up a receiver 22 of a range finder according to the invention are the focusing distance (i.e. the distance between the focusing optics 220 and the projection surface P) as well as the focal length of the focusing optics. These factors are especially to be considered regarding installation space.

Although the invention is illustrated above, partly with reference to some preferred embodiments, it must be understood that numerous modifications and combinations of different features of the embodiments can be made. All of these modifications lie within the scope of the appended claims.

What is claimed is:

1. An airborne range finder configured to be arranged on an aircraft for surveying a target, wherein the airborne range finder comprises:
   an emitter configured for emitting electromagnetic pulses towards the target,
   a receiver configured for receiving backscattered pulses, wherein the receiver comprises:
      a projection surface comprising an inner area and an outer area,
      focusing optics configured and arranged for imaging:
         pulses backscattered from a distance equal to or longer than a threshold distance onto at least a part of the inner area, and
         pulses backscattered from a distance shorter than said threshold distance onto the inner area and at least a part of the outer area,
      a detector configured for detecting and outputting pulses imaged onto the projection surface separately with respect to the inner area and the outer area, and
      a recorder configured for:
         reading the detector,
         storing pulses detected only within the inner area as target pulses,
         storing pulses detected at least in part within the outer area as near-field pulses, and tagging each stored pulse with a corresponding pulse reception time, and a control unit configured for controlling the emitter and the receiver.

2. The airborne range finder according to claim 1, wherein the receiver comprises:
   an optical dissection element comprising
      an inlet forming the projection surface with the inner area and an outer area,
      a first outlet configured for outputting light entering the inner area of the inlet, and
      a second outlet configured for outputting light entering the outer area of the inlet.

3. The airborne range finder according to claim 1, wherein the inner area corresponds to the circle of confusion of a pulse backscattered from the threshold distance.

4. The airborne range finder according to claim 1, wherein the focusing optics comprises a motor configured for adjusting the focal point.

5. The airborne range finder according to claim 4, wherein the control unit is configured for controlling the motor based on a current distance between the target and the airborne range finder.

6. The airborne range finder according to claim 1, wherein the focusing optics and the projection surface are arranged and configured with regard to focusing distance and focal length such that the imaging on the projection surface of pulses backscattered from a distance equal to or longer than the threshold distance remains inside the inner area.

7. The airborne range finder according to claim 1, wherein the depth of field of the focusing optics is adapted such that the circle of confusion of a pulse backscattered from a distance equal to or longer than the threshold distance is equal to or smaller than the inner area.

8. The airborne range finder according to claim 2, wherein the optical dissection element is a fibre optics apparatus, and wherein at least one of the inner area and the outer area is formed by at least one ending of a fibre comprised by the fibre optics apparatus.

9. The airborne range finder according to claim 1, wherein the detector is configured for suppressing the outputting of pulses detected on at least the outer area of the projection surface.

10. The airborne range finder according to claim 1, wherein the emitter is configured for modulating the pulses, and the receiver is configured for detecting pulses as reflections of the emitted pulses by said modulation.

11. The airborne range finder according to any of claim 1, comprising:
    an optical element configured for
       deflecting the pulses along pulse paths towards the target, and
       deflecting the backscattered pulses towards the receiver, and
    a motor configured for altering the pulse paths by moving the optical element,
    wherein the control unit is configured for determining directions of the pulse paths.

12. The airborne range finder according to claim 11, wherein the optical element is a prism or a mirror.

13. The airborne range finder according to claim 11, wherein the motor is configured for rotating the optical element around a rotation axis, and wherein the optical element is arranged relative to the emitter in such a way that the optical element deflects the pulses in a defined constant angle relative to the rotation axis or relative to the oscillation axis.

14. The airborne range finder according to claim 1, wherein the recorder is configured for receiving and storing flight data from the aircraft, said flight data comprising flight altitude data.

15. The airborne range finder according to claim 1, further comprising a positioning sensor for determining flight altitude data and position data, wherein the recorder is configured for receiving said flight altitude data and position data from the positioning sensor.

* * * * *